United States Patent [19]

Hough

[11] Patent Number: 5,412,253
[45] Date of Patent: * May 2, 1995

[54] IC MEMORY CARD WITH NON-CONTACT POWER AND DATA CONNECTION

[76] Inventor: Wayne E. Hough, P.O. Box 168, Mukilteo, Wash. 98275

[*] Notice: The portion of the term of this patent subsequent to Jul. 20, 2010 has been disclaimed.

[21] Appl. No.: 65,868

[22] Filed: May 21, 1993

Related U.S. Application Data

[63] Continuation-in-part of Ser. No. 870,887, Apr. 20, 1992, Pat. No. 5,229,652.

[51] Int. Cl.$^6$ .............................................. H01F 38/14
[52] U.S. Cl. ...................................... 307/17; 336/200; 336/215; 235/449
[58] Field of Search ................. 336/DIG. 2, 200, 214, 336/215; 307/104, 17; 235/380, 449, 439; 365/52, 55, 63, 66; 29/602.1, 605, 606, 607

[56] References Cited

U.S. PATENT DOCUMENTS

| | | | |
|---|---|---|---|
| 4,029,945 | 6/1977 | Yamada et al. | 235/380 |
| 4,146,781 | 3/1979 | Machate | 235/439 |
| 4,473,825 | 9/1984 | Walton | 340/825.54 |
| 4,480,178 | 10/1984 | Miller, II | 235/380 |
| 4,506,148 | 3/1985 | Berthold | 235/380 |
| 4,546,241 | 10/1985 | Walton | 235/380 |
| 4,600,829 | 7/1986 | Walton | 235/439 |
| 4,605,844 | 8/1986 | Haggan | 235/380 |
| 4,650,981 | 3/1987 | Foletta | 235/449 |
| 4,692,604 | 9/1987 | Billings | 235/493 |
| 4,720,626 | 1/1988 | Nishikawa | 235/449 |
| 4,791,285 | 12/1988 | Ohki | 235/449 |
| 4,795,898 | 1/1989 | Bernstein | 235/487 |
| 4,797,541 | 1/1989 | Billings | 235/449 |
| 4,798,322 | 1/1989 | Bernstein | 235/487 |
| 4,868,373 | 9/1989 | Opheij | 235/380 |
| 5,015,834 | 5/1991 | Suzuki | 235/493 |

FOREIGN PATENT DOCUMENTS

| | | |
|---|---|---|
| 1230436 | 12/1987 | Canada . |
| 267085 | 5/1988 | European Pat. Off. . |
| 2583538 | 12/1986 | France . |
| 3530217 | 2/1986 | Germany . |
| 3490220 | 5/1987 | Germany . |
| 60-231286 | 11/1985 | Japan . |
| 8402968 | 6/1985 | Netherlands . |
| 2149548 | 6/1989 | United Kingdom . |
| WO8706747 | 5/1987 | WIPO . |
| WO8404612 | 11/1987 | WIPO . |

OTHER PUBLICATIONS

Information sheet–ADE (Applied Digital Electronics, Inc.) of Paoli, Pa., *Smart Card/Smart Key*, dated Apr. 1992.
Information sheet–TDK Corporation, Tokyo, Japan, *Non–Contact IC Card by TDK;* "*Centrosmart Card*", dated Aug. 1991.
J. Moddy, J. Foley, Contactless Coupling for Power and Data, Goddard Space Flight Center, NASA Technical Briefs, Sep. 1988.
Nippon LSI Co., Ltd.: marketing and technical information regarding contactless memory cards.

*Primary Examiner*—Jeffrey A. Gaffin
*Assistant Examiner*—Peter Ganjoo
*Attorney, Agent, or Firm*—Graybeal Jackson Haley & Johnson

[57] ABSTRACT

A non-contact electrical transformer coupling is disclosed that provides electrical power and full duplex digital communications between a host computer and a removable IC memory card. A unique two-part host magnetic core assembly having a quadrafid design forming multiple poles is provided with printed circuit windings and is disposed to receive the IC memory card embedded with core pole pieces and associated printed circuit card windings to complete the magnetic flux paths and transformer coupling. The configuration of the poles and windings form completely independent channels, each of which behaves like a wide-band ferrite core transformer. The independence of each channel enables this unique magnetic core and associated windings to couple relatively large amounts of power to the circuitry of the IC memory card and establish a high-speed bidirectional data link between the host and card.

15 Claims, 7 Drawing Sheets

IC MEMORY CARD WITH NON-CONTACT POWER AND DATA CONNECTION

CROSS REFERENCE TO RELATED APPLICATIONS

This is a continuation in part of U.S. application Ser. No. 07/870,887, filed Apr. 20, 1992, entitled NON-CONTACT DATA AND POWER CONNECTOR FOR COMPUTER BASED MODULES, now U.S. Pat. No. 5,229,652, issued Jul. 20, 1993.

BACKGROUND OF THE INVENTION

The invention relates to the area of plug-in modules for digital computers, particularly IC memory cards. Typical multipin connectors presently used to connect the circuits of removable cards to a host computer have a number of problems, including unreliable performance under harsh environmental conditions such as temperature extremes, shock, vibration, and contamination. Also, they exhibit excessive wear under repeated insertion/removal cycles, and a limit on addressing capability as a result of the parallel interface using one connector pin per address line.

At present, a large number of Industry Standard memory cards exist, having pin counts of 38, 40, 50, 60, 68, and 88 pins. As the pin count has grown to accommodate larger addressing capability and different IC types, such as DRAM, the connector system has become more expensive, and also has the ergonomic disadvantage of ever higher insertion forces. The ideal connector system would be one which allowed very easy insertion, more like a floppy disk, combined with low cost and high reliability. Although non-contact connectors have been used, incorporating a variety of physical effects, such as capacitive, inductive, and optical, these known devices have disadvantages that restrict their applications, including low data rates, high cost, inadequate power delivery, and bulky physical configurations.

In the above mentioned U.S. Pat. No. 5,229,652, this inventor disclosed a non-contact system for general purpose application to computer modules. This application extends the concepts of U.S. Pat. No. 5,229,652, the disclosure of which is incorporated by reference in this present application, to IC memory cards by the added features discussed in the following Summary of the Invention.

SUMMARY OF THE INVENTION

A non-contact coupling is provided to supply power and two-way digital communication between a host computer and an IC memory card, or other removable computer module. The IC memory card is designed to fit a slot in the host coupling assembly, such that an area of the card is interposed between two halves of the host core. One core half is in turn divided into a multiplicity of four core poles in a quadrifid pattern, that are provided with printed circuit windings. The IC memory card has pole pieces that are arrayed to mate with the host core poles and complete magnetic flux paths that traverse the host core halves. Additional printed circuit windings are formed on the IC card at the pole pieces, wound and connected, such that when the IC card is inserted, the core half parts in the host coupling and the pole pieces in the card form a complete magnetic core transformer, having three separate and independent channels or ports for power and full duplex data.

Memory cards must be very thin, particularly so-called "smart cards", which are literally credit cards, and are about 0.76 mm thick. This invention uses magnetic pole pieces that are thin enough, i.e., less than the card thickness, so as to be embedded in the card, while all magnetic return paths are accommodated into the host core parts so that memory (or other removable module) cards of moderate to minimum thickness can be accepted. The two-channel coupling of the disclosed embodiment in U.S. Pat. No. 5,229,652 requires half duplex communication, that is, the same data coupling is used for write data and read data. By this present invention, an additional independent channel is provided, such that full duplex communication can be accommodated. In U.S. Pat. No. 5,229,652, the effective airgap between the host and module magnetic cores elements can change as a result of shock and vibration, and thus affect the primary inductance of the windings. In this present invention, the total airgap is constant as a result of dividing the host core into upper and lower magnetic core parts housing, and as a result, the susceptibility to mechanical misalignment is much less.

In the preferred embodiment the core windings are mounted on thin multilayer printed circuits. One set of windings is used to transfer ac power from host to card, a second winding set is used to transfer serial data from host to card, and a third set is used to transfer serial data from card to host.

The power and data windings are wound in such a way with respect to each other and to the multiple poles of the magnetic cores that no net coupling exists between any one channel and the other channels. Thus, voltage applied to the power windings does not induce net ac voltage in either the data transmit or receive windings, nor does voltage applied to either the transmit or receive windings induce any net voltage in the power windings or in the other data windings. This is the case even though the respective magnetic flux from each channel co-exists in the same magnetic core structure at the same time.

Hence, the transformer core parts and associated windings form an integrated power and full-duplex data coupling device, using a unique transformer core assembly formed by the IC memory card pole pieces and host core parts and special winding arrangement established when the card is inserted in the host receiving slot.

In a preferred embodiment of the invention, the quadrafid magnetic core arrangement provides four magnetic poles (A, B, C, and D) arrayed in quadrants symmetrical about a central axis. A first coupling channel, used for transmission of power to the card, is comprised of a primary winding in the host section and secondary winding in the card section, both wound in the same way, such that the magnetic flux path associated with said first coupling channel is in one (arbitrary) direction for two of the poles (poles A and C), and of opposite direction for the other two poles (poles B and D), thus forming a complete magnetic circuit consisting of the equivalent U-core parts A–B and C–D in parallel.

A second coupling channel, used for transmission of write data to the card circuits, is comprised of a primary winding in the host section and secondary winding in the card section, both wound in the same way, but different from the first coupling channel, such that the magnetic flux path associated with said second coupling channel is in one direction for two of the poles (poles A and B) and of opposite direction for the remaining poles (poles C and D), thus forming a complete magnetic circuit consisting of equivalent U-core parts A–C and B–D in parallel.

A third coupling channel, used for transmission of read data from the card circuits to the host, is comprised of a primary winding in the card section, coupled to a secondary winding in the host section, both wound in the same way, but different from either the first or second coupling channels. The magnetic flux paths for said third channel are thus in one direction for two of the poles (poles A and D) and of opposite direction for the remaining poles (poles B and C), thus forming a complete magnetic circuit, different from the first and second channels, and thus independent of either.

In another preferred embodiment of the invention, circuits are provided to supply power to the card and implement full duplex communication with the card memory circuits. The power supply in the host section consists of a low frequency sinewave applied to the primary winding of the coupling arrangement by means of a power amplifier. The resulting ac voltage coupled to the secondary is then rectified, filtered, and regulated to appropriate dc voltage as required by the card circuitry. Data to be stored in the card memory (write data) is encoded by the host circuits into a form that can be ac coupled through a second transformer channel and is then coupled to the card circuits through said channel, and decoded to recover the information, whereupon the write data is stored in the card memory. Data to be recovered from the card memory (read data) is encoded in a similar manner by the card circuits, coupled through a third coupling channel as previously described, and then decoded by host circuits to recover the read data for use by the host computer.

These and further features, objects, and advantages of the invention will be apparent to those skilled in the art from the following detailed description and appended drawings.

To provide a complete disclosure of the invention, reference is made to the appended drawings and following description of preferred and alternate embodiments.

DESCRIPTION OF THE EMBODIMENTS

Figure 1:
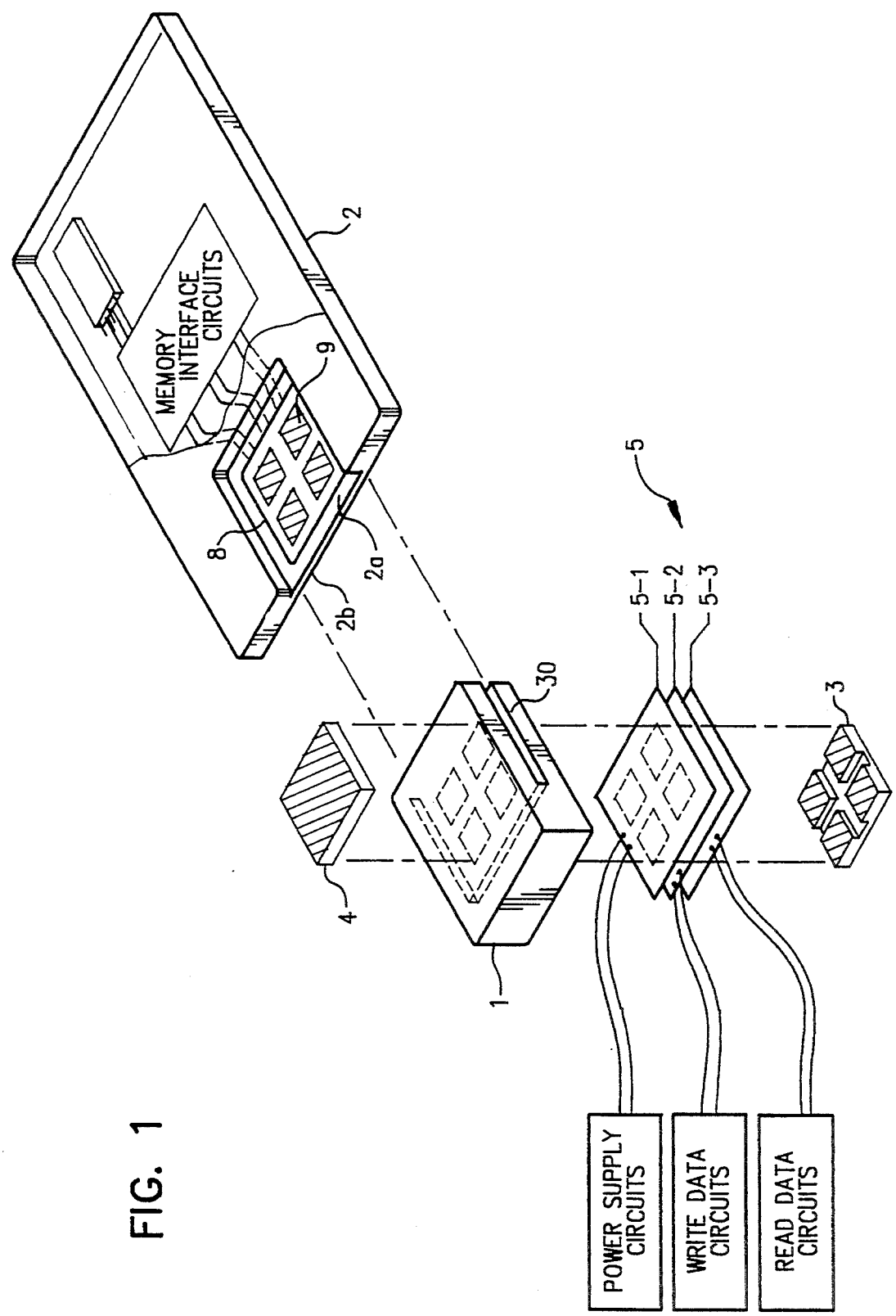
FIG. 1 is an exploded view of the IC memory card and non-contact coupling arrangement.

FIG. 1 illustrates a coupling assembly including housing 1 and its associated parts in which a housing slot 30 receives an IC memory card 2. The IC memory card incorporates a thin mating area 2a of reduced card thickness that extends to an insertion edge 2b of the card and which contains the card non-contact coupling components shown as magnetic pole pieces 9, and printed circuit transformer windings 8 (see FIG. 8). Mating area 2a of the card is sized in thickness, width and depth to fit into slot 30 of host housing 1.

Host housing 1 is fabricated from non-conducting and nonmagnetic material such as plastic or ceramic, and provides mechanical positioning for the inserted card, as well as structural support for the host coupling components. The coupling components contained in housing 1 include a lower transformer core part 3, an upper transformer core part 4, and printed circuit transformer windings 5 (see FIG. 8). These components are positioned within the housing such that when card 2 is properly inserted in the coupling assembly, a complete magnetic circuit is formed by core parts 3, 4, and the card pole pieces 9. This completed magnetic circuit, in conjunction with the transformer windings 5 and 8 form a transformer assembly, affording coupling between host and card to supply the card with electrical power, and support bidirectional data communication.

The magnetic core parts, 3, 4, and pole pieces 9 are fabricated from a magnetically permeable material such as ferrite, which is chosen for high permeability and low losses at the power and data frequencies. The lower core part 3 is of thin and rectangular (or square) outline, having roughly equal width and depth dimensions, but height much smaller than its width, for example in a ratio of 1/10. Four poles A, B, C, and D are formed (see FIG. 3) in a quadrafid pattern on the top surface of core part 3, each having a square outline in width and depth, and disposed symmetrically to the center perpendicular axis of core part 3, and with outer edges flush with the main body of the core. The height of the poles rising from the lower core half body is chosen to be slightly more that the combined thickness of host printed circuit windings 5, so that said winding assembly can be mounted below the top (or mating) surfaces of poles A, B, C, and D as shown generally in FIG. 2.

Contained within card 2 are four thin pole pieces of square outline, fabricated from magnetic material that is the same or similar to that used for core part 3. Each of the pole pieces 9 is of similar width and depth dimension to the corresponding poles A, B, C, and D, in core part 3, and are located on the card area 2a so as to overlay in registration with poles A, B, C, and D when the card is fully inserted in housing slot 30. The height or thickness of each pole piece 9 is slightly more than the thickness of the card's printed circuit transformer windings 8, so that mating of pole pieces 9 and the corresponding pole faces of core parts 3 and 4 is not compromised.

The upper core part 4 of the host section is of square cross section substantially the same width and depth of core part 3, and of similar thickness and of the same magnetic material. Core part 4 is positioned to overlay the previously mentioned lower core part 3. Card pole pieces 9 fill in the gap space between parts 3 and poles A, B, C, D of part 4 when the card is inserted. No windings are required for core part 4, and specific pole faces do not need to be formed, although in an alternative embodiment a quadrafid pattern can be formed and windings accommodated on core part 4 as done for the host lower core half part 3.

Figure 2:
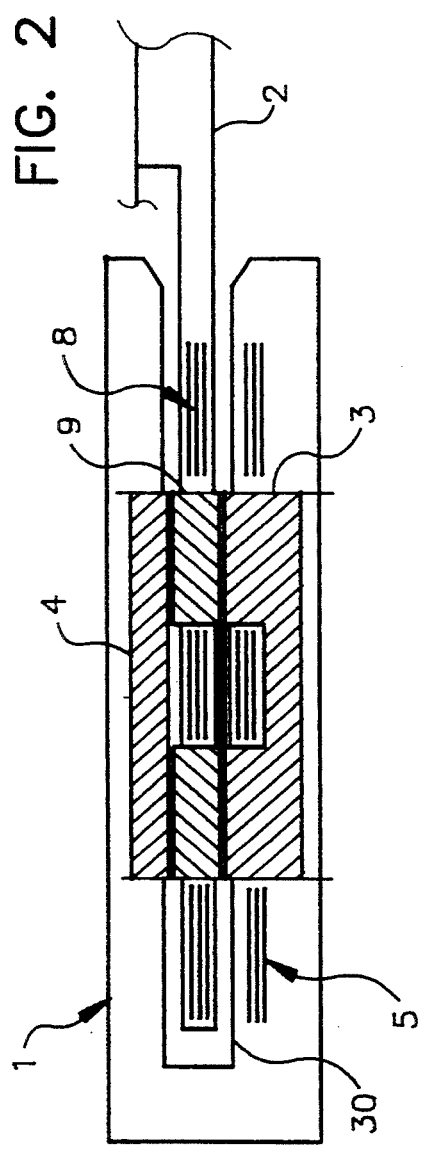
FIG. 2 is a cross sectional view of the IC memory card inserted in the non-contact coupling, showing the host housing, the magnetic core coupling parts, and the printed circuit transformer windings.

As shown in FIG. 2, housing 1 is a rectangular prism of non-magnetic insulating material, as previously mentioned, and contains a slot 30 extending from one end parallel to the exterior top and bottom faces of the housing and in this embodiment opening to the sides of the housing. Slot 30 is of height slightly greater than the corresponding mating height (i.e., thickness) of card area 2a, so that said card can be freely inserted into slot 30. Magnetic core part 3 is embedded in a lower leg of housing 2 such that poles faces A, B, C, and D are coplanar and face toward slot 30, flush with the bottom of the slot and thus located to mate in contact or close proximity with the lower surfaces of card pole pieces 9 upon insertion of the card. The upper magnetic core part 4 is embedded in the upper leg of housing 2 such that the underside of core part 4 is flush with the top of slot 30, and thus located to mate with the upper surfaces of pole pieces 9.

Figure 8:
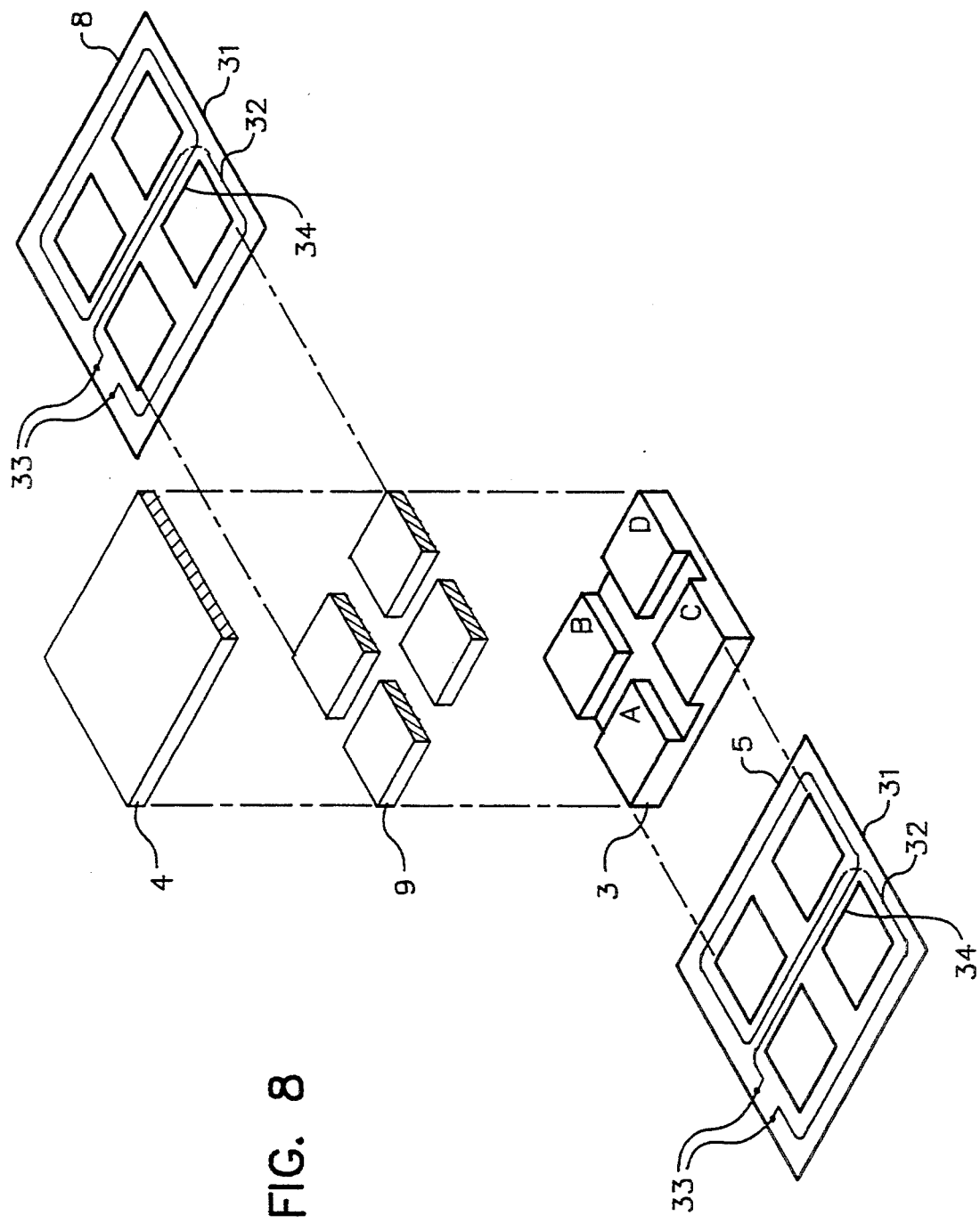
FIG. 8 is an exploded view of the magnetic coupling when the IC memory card is mated to the host coupler, and also shows typical printed circuit transformer windings.

The windings for coupling power, and bidirectional data are fabricated as thin printed circuits on one or more layers. As shown in FIG. 8, each of windings 5, for example, is a layer composed of an insulator wafer 31, printed circuit conductors formed thereon as windings 32, and terminals 33 for connecting the winding to external circuitry or to join other winding segments on adjacent wafers. Each such layer incorporates four pole openings 34, located so as to fit over the four poles of core part 3 or card pole pieces 9 of the respective magnetic core parts.

Figure 3B:
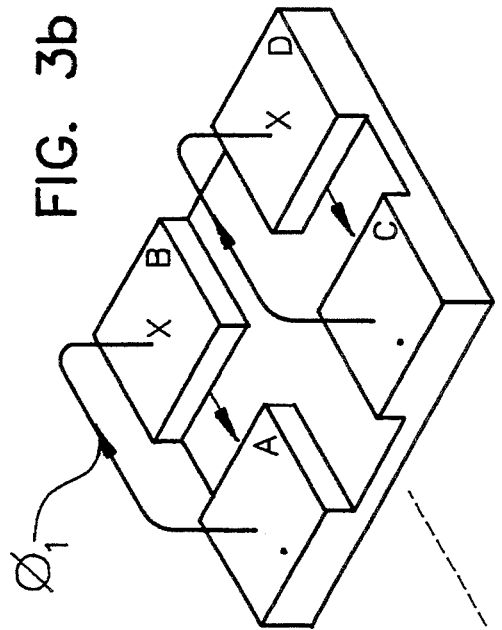
FIG. 3a and 3b illustrate the first primary transformer winding of the host coupling, showing the method of winding and the resulting flux path through the magnetic core for the ac current in the winding.
Figure 3A:
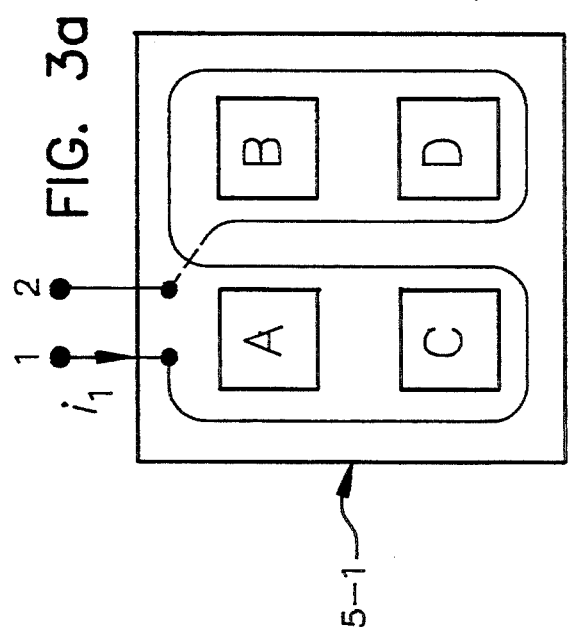

FIG. 3a illustrates the configuration of the first winding 5-1 of the host section, shown as a single turn, for circling (see FIG. 3b) poles A and C with counterclockwise current flow $i_1$ and poles B and D of opposite sense, for clockwise current $i_1$. More than one turn can be employed, and each successive turn would continue in the same sense as the initial turn.

Figure 4B:
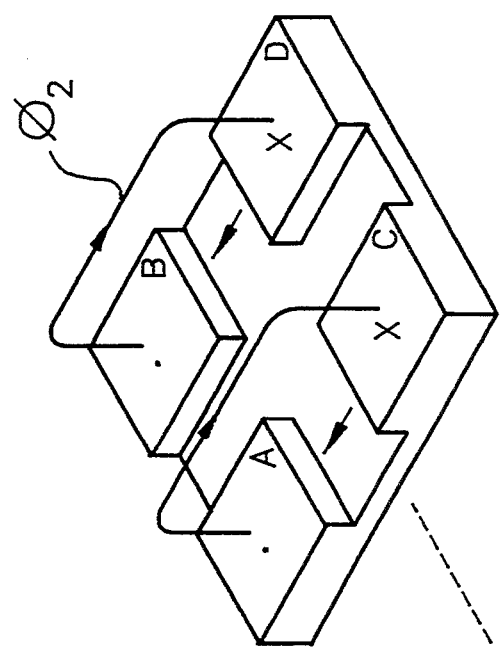
FIG. 4a and 4b illustrate a second transformer winding in the host coupling, showing a different method of winding associated with a second independent channel, and the resulting flux path through the magnetic core resulting from ac current in this second primary.
Figure 4A:
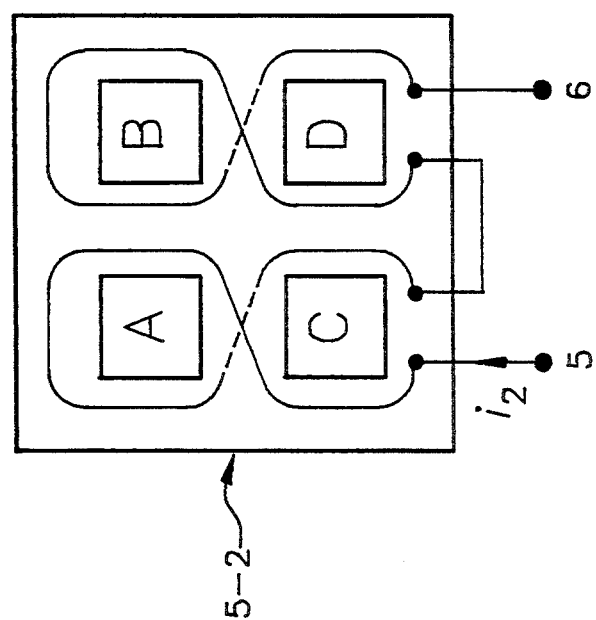
Figures 5A, 5B:
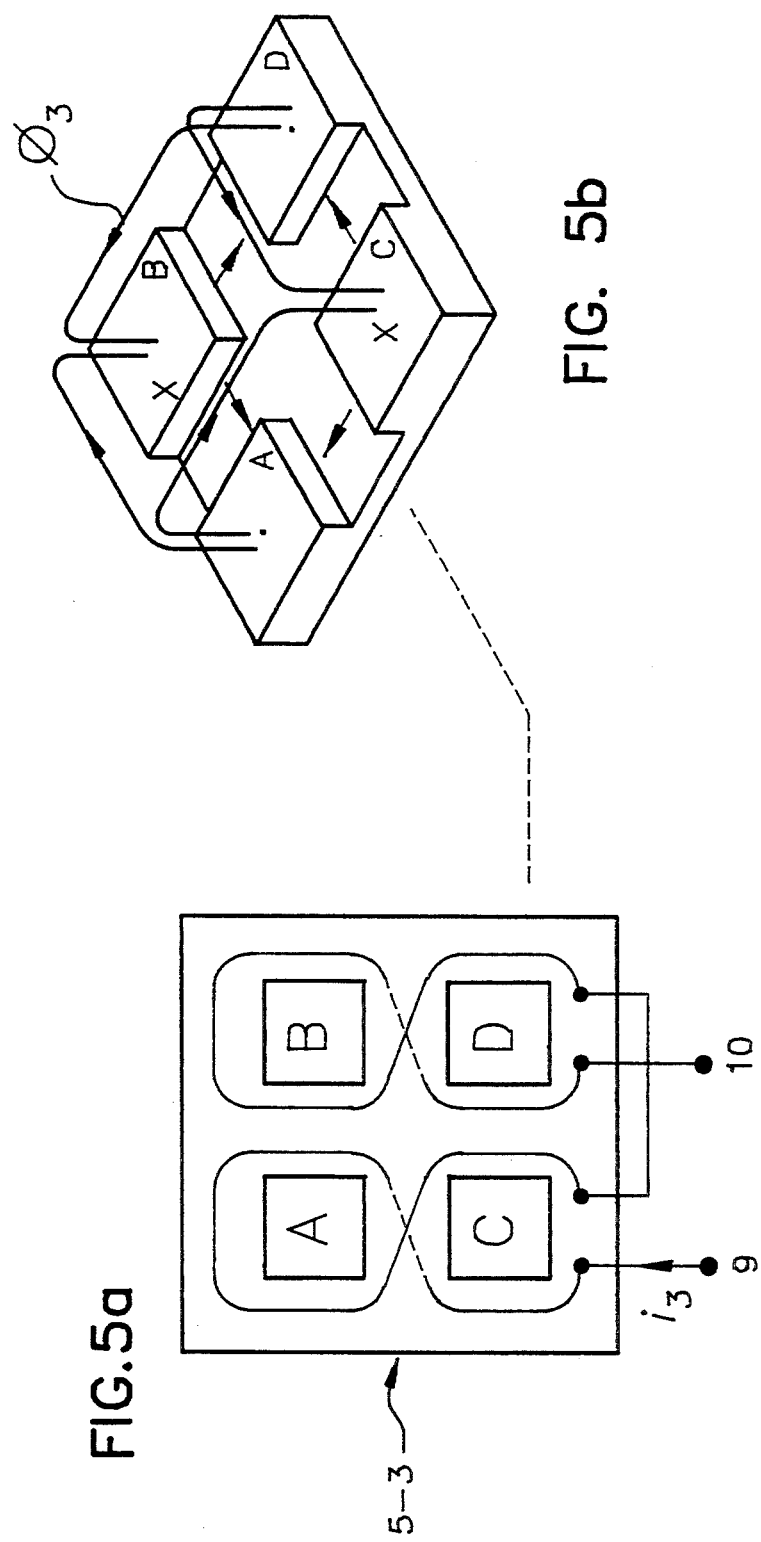
FIG. 5a and 5b illustrate a third transformer winding in the host coupling, associated with a third independent channel, and the related flux path for the ac current in this third winding.

A second winding 5-2 of the host section, as shown in FIG. 4a is wound differently for current encircling poles A and B counterclockwise, and poles C and B clockwise (view with FIG. 5b).

The third host winding 5-3 as shown in FIG. 5a is wound in a still different method from the other two, with current encircling poles A and D counterclockwise, but poles C and B clockwise.

Figure 6:
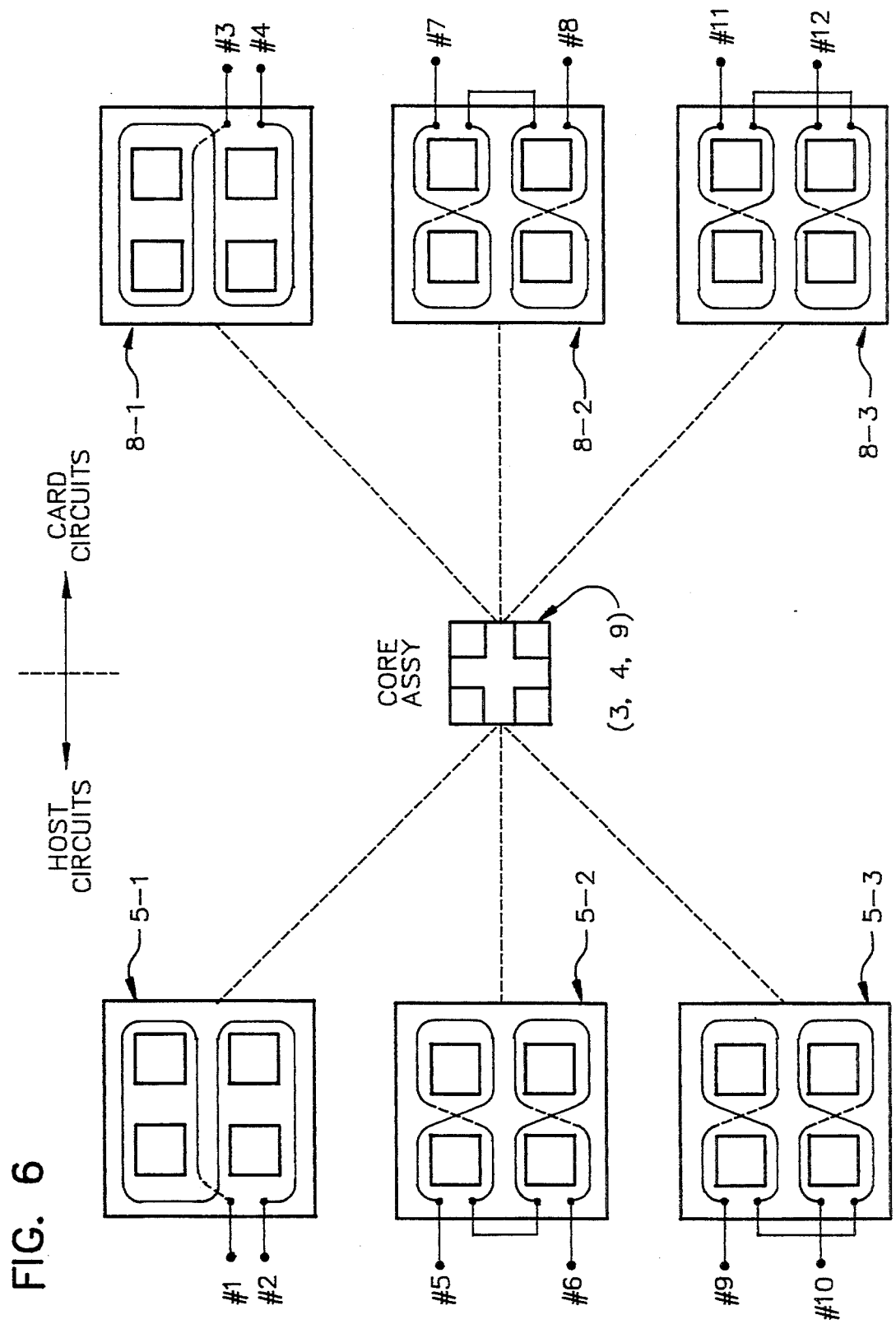
FIG. 6 shows the primary and secondary windings for all three independent channels, as implemented in the completed coupling assembly when the IC memory card is mated in the host computer.

Winding 8 in the card section are also of three different configurations, as shown in FIG. 6. Thus, card winding 8-1 is identical in form to primary winding 5-1, second card winding 8-2 is identical to host winding 5-2, while card winding 8-3 is identical to host winding 5-3. This similarity in form does not preclude different turn counts, taps, and other variations between primary and secondary windings.

The coupling method can now be explained, beginning with winding 5-1. Referring to FIG. 3a and 3b, ac current $i_1$, flowing from terminal #1 to terminal #2 causes winding 5-1 to produce an ac flux $\Phi_1$ in the core part 3, which then flows through pole pieces 9 and core part 4. The sense of this ac flux is such that poles A and C are always in phase, so that the magnetic path for winding 5-1 is the same as though two U-cores were employed in parallel, i.e., U-core A-B, and U-core C-D. Now referring to FIG. 6, card winding 8-1 is wound in the same way as host winding 5-1, so that the ac flux $\Phi_1$ produced as shown in FIG. 3b will induce a voltage in card winding 8-1 identical to the primary ac voltage applied to winding 5-1. As a result, the windings 5-1 and 8-1 exhibit transformer coupling.

A second transformer coupling channel is associated with the winding 5-2 as illustrated in FIG. 4a. Assuming ac current $i_2$ flowing into terminal #5, an ac flux $\Phi_2$ will be produced such that the polarity is the same for poles A and B. The magnetic path for winding 5-2 is the same as though two U-cores were employed in parallel, A–C and B–D. Card winding 82, shown in FIG. 6, is wound in the same way as winding 5-2, and thus produces a voltage at terminals #7–#8 identical to that applied to terminals #5–#6, so that there is an equivalent transformer coupling between windings 5-2 and 8-2.

A third coupling channel is associated with winding 5-3 as illustrated in FIG. 5a. The ac current $i_3$ flowing into terminal #9 results in the ac flux pattern as shown in FIG. 5b, with the flux leaving pole A returning equally through poles B and C. Flux leaving pole D also splits, returning through poles B and C. As a result, flux from poles A and D is always in the same direction. The associated card winding 8-3 is wound in the same way as winding 5-3, thus coupling terminals #9–#10 to terminals #11–#12.

The three channels thus described are independent. For example, starting with the first channel, the ac voltage applied to terminals #1–#2 of winding 5-1 does not produce any net voltage in windings 8-2 or 8-3. Referring to FIGS. 4a,b and 5a,b, it is clear that the ac flux associated with winding 5-1 is at all times of such polarity that all voltages generated in windings 8-2 and 8-3 as a result of $\Phi_1$ sum to zero. Taking the case of windings 5-2, and referring to FIGS. 4a,b, it is apparent that any ac flux that is in phase for poles A and C, as well as in-phase for poles B and D (as is the case for flux $\Phi_1$) will generate opposing voltages in the turns of windings 5-2 which encircle these poles.

The same reasoning and function applies to windings 5-3, and 8-3. Referring to FIGS. 5a,b, it is obvious that the flux $\Phi_1$ which is in-phase for poles A and C, produces no net voltage in those turns of windings 5-3 which link A–C and B–D.

From reciprocity it is established that as voltages across winding 5-1 produces no net voltage in windings 5-2 or 5-3, so also any voltages applied to winding 5-2 produce no voltage in winding 5-1 or 5-3, and it follows that voltage applied across 5-3 produces no voltage in 5-1 or 5-3. All three channels are thus completely independent, and, although each otherwise functions as a normal transformer, it is not "aware" of the other two channels.

Because each channel is a transformer, all of the usual possibilities can be implemented within that channel. For example, by using different numbers of turns, a channel can be "stepped up" or "stepped down", or windings can have centertaps or multiple secondaries of different voltages. As with any conventional transformer, each channel is passive and bidirectional; the signals can flow in either direction. For example, in the case of winding 5-3 coupled to winding 8-3, either can be the primary and the other a secondary.

Figure 7:
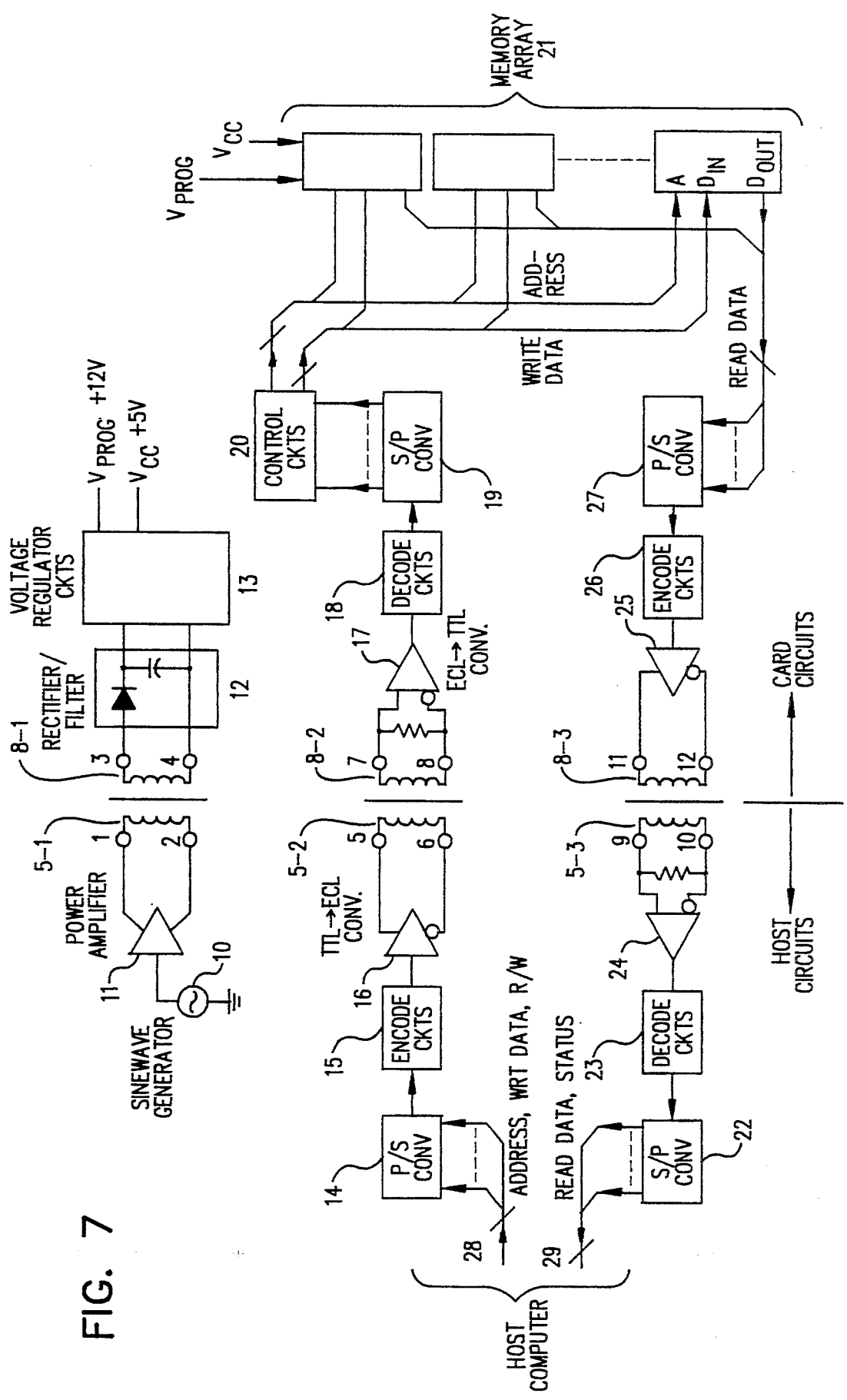
FIG. 7 is a block diagram of typical circuits associated with the non-contact coupling device method.

FIG. 7 is a block diagram of typical circuits by which an IC memory card can be written to (and read from) a host computer. Power for the IC memory card is supplied from power coupling windings 5-1 and 8-1. A sinewave source 10 produces a pure and relatively low frequency sinewave of voltage, which is amplified by power amplifier 11 and supplied differentially to primary terminals #1–#2 of the coupler's winding 5-1. A relatively low frequency is used, typically between 30 kHz and 100 kHz, so that an efficient power amplifier can be used. A commercial example of amplifier 11 is the Elantec EL3036, an IC servo amplifier made by Elantec, Inc., Milpitas, Calif., designed for driving dc motors in disk drives. This design can supply up to 2 amps into a differential load, and has bandwidth greater than 100 kHz.

When a card is inserted, the secondary winding 8-1 receives ac power which is rectified and filtered by diode, capacitor circuit 12 to provide dc voltage for the card electronics. Conventional voltage regulation circuit 13 supplies the correct voltages, depending on the type of IC memory used by the card. When flash EEPROM is used, for example, a +12 v programming voltage is required in addition to a conventional +5 v logic supply.

The memory card is controlled from a host computer, which supplies commands, address, control signals, and write data to the card, and receives read data and card status in return. These signals are typically supplied from the computer data and address bus, or from a microprocessor directly. The parallel signals representing address, write data, and R/W shown at 28 are supplied to a parallel-to-serial conversion circuit 14 which changes the information to a high speed Non-Return-to-Zero (NRZ) serial bit stream. This bit stream is then encoded by encode circuit 15 into a form which can be transformer coupled, i.e., Manchester coding, Alternate Mark Inversion (AMI), 8B/10B, or other ac signals. A commercial example of a suitable AMI encoder/decoder is the Silicon Systems SSI 78P2361 made by Silicon Systems, Inc., Tustin, Calif., which is designed for the 51.84 Mbit/sec telephone standard, STS-1.

The encoded bit stream is supplied to winding 5-2 by ECL translator 16, which can drive differential loads through complementary outputs. The transformed coupled ECL signals are received by ECL-to-TTL level translator 17, and decoded by circuits 18 to recover the NRZ data. Finally, serial-to-parallel converter 19 deserializes this NRZ data to provide parallel signals representing the original address, write data, and related timing signals, as known per se, for cooperating with memory array 21. Virtually any form of IC memory can be used for array 21, including static RAM, ROM, flash EEPROM, DRAM, and so on. The control circuits 20 provide appropriate memory timing signals for Read and Write cycles as required by the particular form of memory.

Data read from the memory array 21 follows a path whose functions are similar to the write circuits. Read data is serialized by converter 27, encoded by circuits 26, and coupled to winding 8-3 through ECL translator 25. The data is then received by translator 24 connected to winding 5-3, decoded by circuit 23, and finally deserialized by converter 22, forming parallel data to the host, representing that read from the array 21.

Alternative application and features include, for example, a "hot switching" capability. The card can be inserted or removed when host power is applied without affecting the stored data, or causing overcurrents or other non-defined conditions. When the card is not present, the impedance at terminals #1–#2 of winding 5-1 is very low, as a result of the absence of the pole pieces in the card which complete the magnetic path. As the card is inserted, this impedance linearly increases, until the magnetic path is complete. At this point, the primary inductance is high, and thus represents an impedance much higher than that represented by the reflected load of the card power supply.

Power amplifier 11 is a transconductance design, i.e., the ac output current is proportional to the input voltage. As the load impedance at terminals #1–#2 changes, therefore, the ac current remains constant. When the card is absent, the voltage at these terminals is very low; as the card is inserted, this voltage rises linearly, until full voltage is achieved at full insertion. Undefined transients such as overcurrent do not occur.

It would be possible to sense card presence by monitoring the voltage at terminals #1–#2 of winding 5-1. For example, a voltage comparator could be applied at winding 5-1, such that the output would reflect whether or not the voltage exceeded some threshold. This signal would be supplied to the host computer as a flag representing "valid card present". The host would thus inhibit store operations to the card under conditions of insertion or removal.

Also, the coupling is very tolerant of misalignment due to shock, vibration, or mechanical dislocations. In the case of variations in the airgap between the magnetic cores in the host housing and the inserted card, the total effective gap is constant, since the upper and lower magnetic core parts are mounted in the host housing. Should the card be closer to the upper core part, for example, it is thus farther from the lower core part by the same, and thus compensating, amount. Variations in the other two dimensions can be accommodated, as the pole face areas are very large, as compared to the cross sectional area of the main body of each magnetic core part.

Further still, this coupling can operate reliably over a wide range of ambient temperature, as there are no contacts to oxidize, and no insulating materials to melt. The primary limit on temperature is the Curie temperature of the magnetic cores, which is typically above 180 degrees C. Exposure to dirt, liquids, and other contamination is generally not a problem, as the coupling impedances are very low. Operation under water is possible, even seawater, so long as the winding voltages do not cause shorting of the winding turns via the seawater ionization.

While only particular embodiments have been disclosed herein, it will be readily apparent to persons skilled in this art that numerous changes and modifications can be made to this embodiment, including the use of equivalent means, devices and method steps, without departing from the spirit of the invention.

What is claimed is:

1. A non-contact connector for coupling a removable electronic module with a host device, comprising:
   a host transformer core assembly having first and second core parts mounted in fixed spaced relationship with a gap between confronting core part faces, at least one of said first and second core parts having a quadrafid pattern formed on its confronting face to define core poles;
   host transformer winding means mounted on said core poles;
   a removable electronic module core assembly having a plurality of core pole pieces arranged in a fixed pattern matching the core poles of said host parts quadrafid pattern and being adapted for insertion in said gap between said core part faces to complete magnetic flux paths through said poles of said first and second host core parts and said module pole pieces; and module transformer winding means mounted on said module core pole pieces so as to be removably transformer coupled to said host winding means via said complete magnetic flux paths.

2. The non-contact connector of claim 1, wherein at least one of said first and second host transformer core parts has four core poles.

3. The non-contact connector of claim 2, wherein said host and module winding means each comprise a set of separate channel windings arranged on said host and module core assemblies so as to form with four poles separate independent channels for data or power transfer between host and module.

4. The non-contact connector of claim 1, wherein said host core poles terminate in a common plane equidistantly spaced from the other host core part and said module pole pieces are in a coplanar array for insertion in said gap.

5. The non-contact connector of claim 4, wherein said poles are arranged in quadrants substantially symmetrical with a midpoint of said first and second host transformer core parts.

6. The non-contact connector of claim 5 comprising host and module interface circuit means associated with said host and module winding means for power and data coupling through power and data flux traversing through said poles of said first and second host transformer core parts and through said module pole pieces in said gap.

7. The non-contact power and data connector of claim 1, further comprising:

mechanical guide means for causing said module pole pieces to be positioned and held in mating relation with said poles of said host core part.

8. The non-contact connector of claim 1, further comprising host interface electronic means including alternating current power signal means and data encoder-decoder means connected to said host winding means.

9. The non-contact connector of claim 1, further comprising module interface electronic means including power rectifier means and data encoder-decoder means connected to said module winding means.

10. The non-contact connector of claim 8, wherein said host and module interface circuit means each comprise data encoding and data decoding means, and wherein said host and module winding means comprise separate independent data channels for full duplex data coupling between said host and module.

11. The non-contact power and data connector of claim 8, wherein said data encoder and data decoder means comprise means for conversion between serial and parallel data.

12. The non-contact connector of claim 10, wherein said host and module winding means each comprise separate write data and read data winding channels.

13. The non-contact connector of claim 1, wherein said module comprises a memory card having an insertion portion on which said pole pieces are fixedly mounted in a substantially coplanar array.

14. A non-contact power and data coupling for a removable electronic module connected with a host device comprising:

host transformer core having separate spaced parts, and formed with coplanar poles that project into a core gap between said separate spaced parts and being adapted for mounting on a host;

module core pole pieces adapted to be fixed in a coplanar array on a removable module for filling said core gap between said host transformer core parts;

primary and secondary power winding means on said host transformer core parts and module core pole pieces, respectively, for causing power flux to traverse through certain of said poles;

first and second sets of primary and secondary data winding means on said host transformer core parts and module core pole pieces for causing first and second independent data channel flux paths to traverse through certain of said poles;

said first and second sets of data winding means being so wound in relation to said poles and said power winding means that said power flux mutually cancels in those poles that couple data flux between said primary and secondary data winding means, and said data channel flux mutually cancels in those poles to maintain said first and second sets of data windings as independent data channels.

15. The non-contact power and data coupling of claim 13, wherein said removable electronic module is a memory card.

* * * * *